United States Patent [19]

Hausmann

[11] 3,803,356

[45] Apr. 9, 1974

[54] METHOD AND APPARATUS FOR SYNCHRONIZING DATA TRANSMISSION NETWORKS

[75] Inventor: Herbert Hausmann, Olching, Germany

[73] Assignee: Siemens Aktiengesellschaft, Berlin and Munich, Germany

[22] Filed: May 5, 1972

[21] Appl. No.: 250,496

[30] Foreign Application Priority Data

May 11, 1971 Germany ........................... 2123354

[52] U.S. Cl. ........................................... 178/69.5 R

[51] Int. Cl. ............................................ H04l 7/00

[58] Field of Search .............. 178/69.5 R, 69.5 DC; 179/15 BS, 15 AT, 15 BA, 15 BV; 328/133, 328/134, 146, 147, 148, 149, 155, 179; 307/238

[56] References Cited

UNITED STATES PATENTS

| | | | |
|---|---|---|---|
| 3,428,898 | 2/1969 | Jacobsen | 325/15 |
| 3,085,200 | 4/1963 | Goodall | 325/13 |
| 3,141,926 | 7/1964 | Newell | 178/5.4 |
| 3,531,777 | 9/1970 | West | 340/172.5 |

*Primary Examiner*—Richard Murray

[57] ABSTRACT

Method and apparatus for synchronizing data transmission networks having sequentially connected and synchronously operating partial line sections are described. Data signals arriving over a given partial section are intermediately stored in a matching circuit. This storing operation takes place under the control of a write pulse taken from the pulse frequency at the receiving station. The reading out of the stored data signals takes place under the control of a read pulse taken from the pulse frequency at the transmitting station. By constantly comparing the transmission and receiving pulses, the continuing succession of write and read pulses is controlled. From the results of such comparisons a positive or negative regulating signal for regulating the frequency of the transmission signal is obtained.

6 Claims, 4 Drawing Figures

METHOD AND APPARATUS FOR SYNCHRONIZING DATA TRANSMISSION NETWORKS

BACKGROUND OF THE INVENTION

The invention relates to a method and apparatus for synchronizing data transmission networks with several line sections which are connected one after the other and are operated synchronously.

The transmission of data in synchronous operation has more and more significance with increasing transmission speeds. One characteristic of synchronous data transmission is that the receiving station is always synchronized to the pulse of the transmitting station. Thus, a synchronous system is a transmission system in which transmitting and receiving devices operate continuously and have the same frequency, as well as the same phase relation. Even with use of frequency-stabilized circuits, however, it cannot be precluded with certainty that deviations between transmission frequency and reception frequency occur regularly. For this reason arrangements have become known with which the synchronization on a data transmission section is constantly monitored, and these devices initiate a correction process when the frequency deviations between transmitting and receiving station exceed a prescribed value.

The known procedures and devices which insure the synchronization between a data transmitter and a data receiver can, however, be installed reasonably only when the data transmission takes place over a single synchronous section, especially because of the processes necessary to establish the synchronization at the start of a data transmission. If the data transmission is to take place over several sequentially connected partial sections, of which each one represents a constant phase synchronous section, then the known procedures for establishing and maintaining the synchronization are no longer suitable.

Proceeding from the known state of the art, according to which a receiving pulse is taken from the transmitted data signals at the receiver location, e.g., in a synchronous receiver, it has been proposed that this receiving pulse be used as transmitting pulse for the following partial section. In this way it is sought to establish synchronization between two successive partial sections which are phased-in independently of each other. However, since we are dealing with partial sections which are phased-in completely independently of each other, there is the disadvantage that phase shifts and spurious oscillations will appear. Further, simply the phasing in of a transmission section constructed of two partial sections requires an amount of time in excess of that necessary for the phasing in of a single partial section will be connected with the procedure of direct pulse through-switching. With adverse output conditions, which must be expected, especially when the transmission section is supposed to operate not only over two but over a series of sequentially connected partial sections, a proper phased-in state of the whole section can frequently not be achieved at all.

It is an object of this invention to provide a means and method whereby the foregoing disadvantages can be eliminated.

SUMMARY OF THE INVENTION

Through the invention, which also utilizes the receiving step pulse which is available at the receiver location, these difficulties are avoided. The solution according to the invention is that the data signals arriving over a partial section proceed to an intermediate store in a matching circuit. The storing of the data signals occurs under the control of a write-pulse taken from the receiving pulse, and read-out from storage occurs under control of a read pulse taken from a transmission pulse. Through a continual comparison of the transmission pulse with the receiving pulse the constant succession of write and read pulses is controlled, and a positive or negative regulating value is obtained for regulating the frequency of the transmission pulse.

As is explained in detail hereinbelow the comparison can take place in a first and a second comparison device in which a frequency deviation between the receiving pulse and the transmission pulse is recognized. The receiving pulse is forwarded from these devices as a write pulse, and the transmission pulse is forwarded as a read pulse. But, these pulses are delayed. Simultaneously, either a positive or a negative regulating value is available from the comparison devices. The frequency of the transmission pulse can be controlled by the regulating values, whereby the positive regulating value causes an increase and the negative regulating value causes a decrease in the frquency of the transmission pulse.

The method and apparatus in accordance with the invention enable several constantly phased-in synchronous sections to be connected into a transmission section at an arbitrary time, without the transmission section having to be phased in anew or the differences of the phase positions of the step on the individual partial sections having to be eliminated. Further, the invention permits the realization of the advantage that the successive connection, over switching stations, of the synchronous sections into one transmission section without loss of time for phase-in processes can also take place. For example, connections can be made over dial or coupling stages, whereby conventional as well as push button dialing is possible. A matching circuit operating according to the invention has the advantage that it operates code-independent, i.e., that the transmission itself is code-transparent, when it is established that the synchronous movement of the respective data transmission devices terminating a synchronous section at both ends is maintained, when continuous data signals are transmitted.

BRIEF DESCRIPTION OF THE DRAWINGS

The principles of this invention will be most readily understood by reference to a description given hereinbelow of a preferred form for execution of the method of the invention, as well as a description of a preferred embodiment of the apparatus of the invention. These preferred embodiments are illustrated in the drawings in which.

DETAILED DESCRIPTION OF THE DRAWINGS

Figure 1:
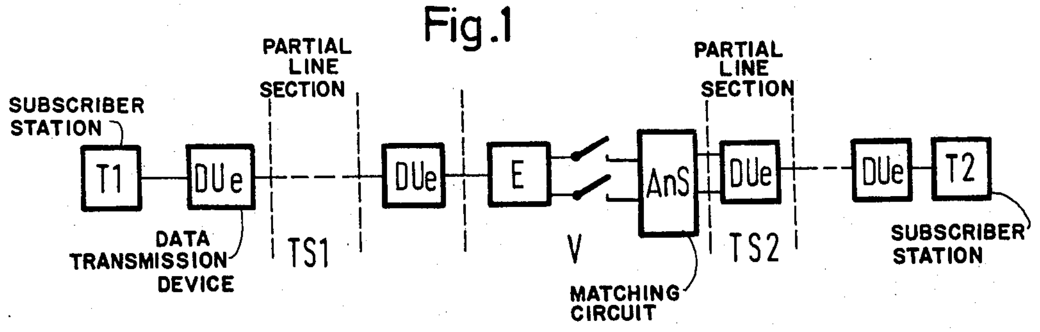
FIG. 1 is a block diagram of a conventional data transmission section leading over two synchronously phased-in partial sections.

In FIG. 1, two subscriber stations T1 and T2, along with the synchronously operating data transmission devices DU*e* of known construction assigned to them, are connected to the transmission section leading over two synchronously phased-in partial sections T*s*1 and T*s*2. The connecting of the two partial sections, which, for example, can be office connection lines, can occur in an exchange station V. In the exchange, there are, as well, data transmission devices DU*e* of known construction for connection to the first and second partial sections. A matching circuit A*n*S is connected in the exchange for establishing and monitoring the synchronization between the two partial sections T*s*1 and T*s*2. If the data transmission section were to lead over more than two partial sections, then the matching circuit would also be present in the following exchange stations not shown in FIG. 1.

Figure 2:
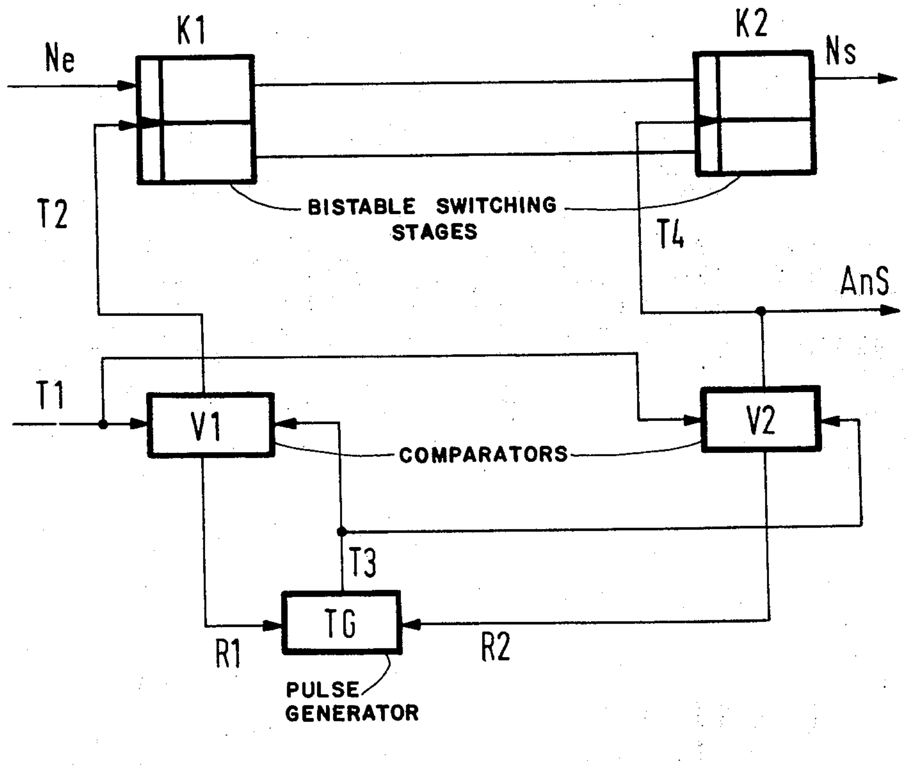
FIG. 2 is a block-schematic diagram of a preferred embodiment of a matching circuit connected between two successive partial sections, which matching circuit operates according to the invention.

In particular, the matching circuit A*n*S contains, as shown in FIG. 2, a one-bit store, which preferably comprises two bistable stages K1 and K2. Further, two comparision devices V1 and V2, as well as a pulse generator TG for generation of its own transmission pulse are provided. The latter elements are of known construction. The bistable stage K1 receives over its information input the data signals N*e* arriving over the partial section T*s*1; whereas the bistable stage K2 forwards the data signals Ns to the following section T*s*2 over its information output. A receiving pulse T1 which is taken from the received information in the data transmission device, as well as the internally generated transmission pulse, are available to the comparison devices V1 and V2. A write pulse T2 is available over a pulse output of the first comparision device V1, which is connected with the pulse input of the first switching stage K1. The read pulse T4 is available over the pulse output of the second comparison device V2, which is connected with the pulse input of the switching stage K2. Regulating signals R1 and R2, which serve to regulate the transmission pulse T3, are emitted by the comparison devices V1 and V2. The data signals to be transmitted through further partial sections of the system are emitted from the bistable stage K2, and are indicated in FIG. 2 by the reference letters N*s*.

Figure 3:
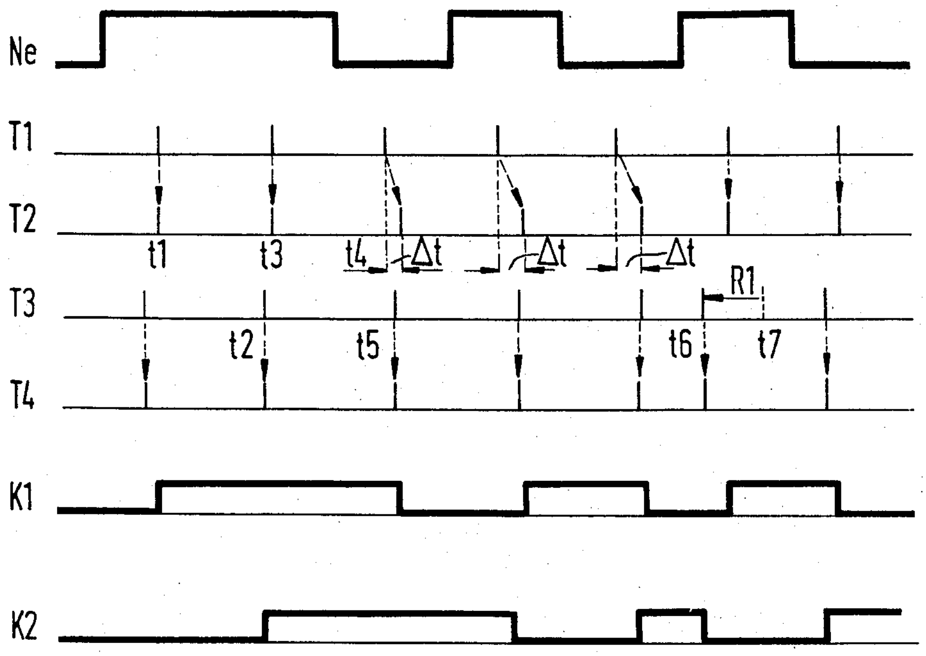
FIGS. 3 and 4 are waveform diagrams illustrating the operations of the FIGS. 1 and 2 circuits.
Figure 4:
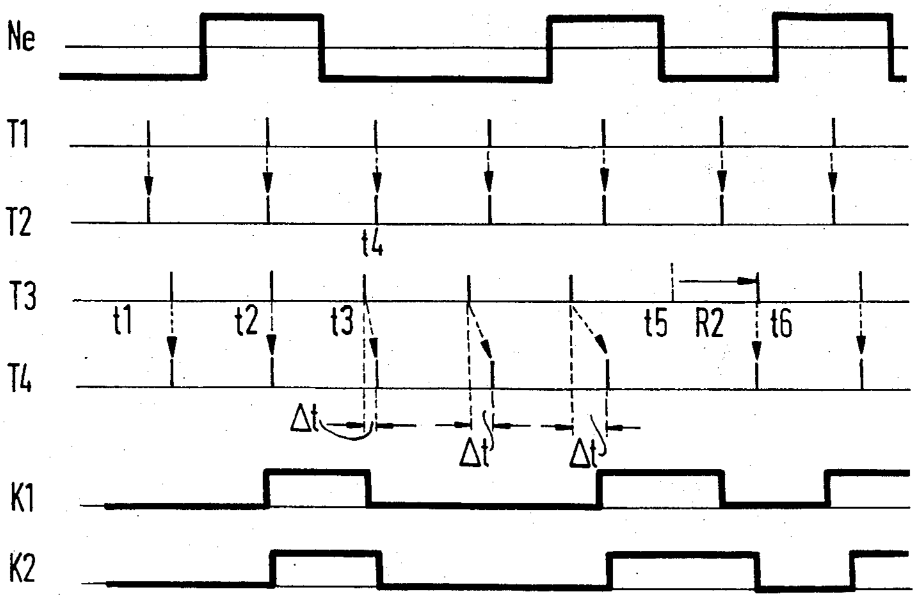

To explain the manner of operation of the matching circuit shown in FIG. 2, reference is made to the pulse diagrams shown in FIGS. 3 and 4. In line 1 of FIG. 3 is shown the received data signal N*e*, in lines 2, 3, 4 and 5 are shown, respectively, the receiving pulse T1, the write pulse T2, the transmission pulse T3 and the read pulse T4. The bistable states of the one-bit store, i.e., the states of bistable stages K1 and K2 are shown in lines 6 and 7. The state of the bistable stages represent simultaneously the data signal N*s* to be transmitted.

In the following, referring to FIGS. 2 and 3, it is assumed that the frequency of the transmission pulse T3 is smaller than the frequency of the receiving pulse T1. Of course, the invention will operate under different signal relationships. Taking this assumption as a basis, it can happen that no transmission pulse T3 occurrs between two successive receiving pulses T1. In FIG. 3, for example, between the receiving pulses T1 arriving at moments t3 and t4 no transmission pulse T3 is available. This means that the incoming data signal N*e* is entered into the bistable stage K1 with the write pulse T2 taken from the receiving pulse T1 at moment t1, and is transferred to bistable stage K2 with the next read pulse T4 taken from the transmission pulse T3, at moment *t*2. With the following write pulse T2 the next step of the data signal N*e* can now be entered into the bistable stage K1 at moment *t*3. However, it must be remembered that in this case the frequency of the transmission pulse T3 is smaller than the frequency of the receiving pulse T1. Thus, the following receiving pulse T1 arriving at moment *t*4, which normally is forwarded as write pulse T2 to the pulse input of the inversion stage K1, the information entered with the preceeding pulse would now, however, be superscribed and, therefore, destroyed. This situation results from the fact that until the arrival of this receiving pulse no transmission pulse, and thus no read pulse T4 was available. In accordance with the invention this situation is recognized in the comparison device V1, to which the receiving and the transmission pulses are available, and the write pulse T2 is delayed by a period $\Delta t$.

It is of advantage to form the delay time $\Delta t$ as a function of the arrival of the following transmission pulse. For example, if the following transmission pulse T3 arrives at moment *t*5, then immediately after the information has been transferred from bistable stage K1 to the bistable stage K2, with the read pulse T4 taken from the transmission pulse T3, the write pulse T2 can arrive at the pulse input of bistable stage K1. Upon determination of a frequency deviation in the comparison device V1, however, not only is the write pulse T2 delayed in the manner described, but the regulating signal R1 is formed and directed to the pulse generator TG. The change of the frequency of the transmission pulse, thus, in the case examined here an increase in frequency can be initiated immediately after determination of a first frequency deviation. It should be noted that it is appropriate to introduce the regulating process only after delay of the write pulse has occurred several times, to which reference will be made later. For example, as can be recognized with the aid of FIG. 3, the frequency of the transmission pulse T3 emitted by the pulse generator TG is changed only after a threefold delay of the write pulse. Thus, in consequence of the influence of the positive regulating signal R1, the frequency of T3 is raised, so that the transmission pulse occurring in the unregulated case at time t7 is now emitted at time *t*6. Thereby, it is achieved that in the further operation a read pulse again always follows a write pulse.

In the case of a solitary frequency change, when only an additional transmission pulse is interposed, but which is then followed by pulses with the original frequency, this process can be repeated several times in the course of the transmission. But, it is also possible to insert not only a single pulse, but also to raise the frequency of the following transmission pulses, so that perfect pulse synchronization prevails between the two partial sections T*s*1 and T*s*2 for the remainder of the transmission.

The described processes operate in a similar manner when, as shown in FIG. 4, the frequency of the transmission pulse T3 is larger than that of the receiving pulse T1. In this case it can happen that no receiving pulse occurs between two successive transmission pulses. That is, the information which was entered into the switching stage K1 with a write pulse taken from the receiving pulse can be read out twice. In FIG. 4 this occurs at times $t2$ and $t3$. This case is recognized in the comparison device V2.

The transmission pulse T3 arriving at moment t3 is not through-switched immediately as a read pulse, as would normally happen, but rather it is delayed by a period $\Delta t$, until the following receiving pulse arrives and the data signal is entered responsive thereto. The reading process is thus initiated only after the process of entering the information, which occurs with the write pulse at moment t4. As one can recognize with the aid of the pulse diagram of FIG. 4, the negative regulating signal R2 becomes effective only after the third delay, in such a manner that the pulse generator TG is made to decrease the frequency of the transmission pulse T3. In FIG. 4 one recognizes the regulating effect of the regulating signal R2 in that now the transmission pulse T3 which is actually to be emitted at moment t5 first appears at moment t6. For the following process it is then again guaranteed that only one read pulse follows each write pulse. In this case, as well, a solitary lengthening of the pulse can take place with or without subsequent change in the transmission pulse frequency.

By following the principles of the invention, it is avoided that, on the basis of deviations between the receiving pulse and the transmission pulse, destruction of the data signals entered into the intermediate store occurs, or that a datum is read twice. Whereas in the first case the comparison device V1 becomes active, in the second case the comparison device V2 becomes active. In both cases unambiguous signals are available for the regulation of the transmission pulse T3.

As was shown in FIGS. 3 and 4, the positive or negative regulating signals R1 or R2 sent by the first or second comparison device to the pulse generator TG become effective only after a three-time delay of the write or read pulse. This has the advantage that solitary changes in the receiving pulse, which do not permit a final consequence of having the pulses diverge, do not effect a change of frequency of the transmission pulse.

The invention is especially useful in networks in which encoded messages are transmitted. Security requirements can be met with little difficulty, because a transmission line between two subscribers can be formed by connection of several partial sections of which each represents a constantly phased-in synchronous section. Thus, for example, several code areas can be formed in one network, without having to make allowance for the limitation that only the subscribers of one code area can communicate with each other.

The security stipulation designated by the expression "Traffic Flow Security" is also fulfilled by using the procedure of the invention. This requirement presupposes an uninterrupted flow of signals on the transmission sections. Since by following the invention an arbitrary number of continuously phased-in partial sections can be connected, the transmission of signals in synchronous operation on each of these partial sections is possible when they are not components of a transmission section connected to transmit messages.

The invention has been described hereinabove in terms of particular, exemplary embodiments. It must be recognized, however, that changes in or modifications to these embodiments can be made within the spirit and scope of the invention as defined by the appended claims.

I claim:

1. A method for synchronizing a data path connecting a transmitting station and a receiving station, which stations have operating pulse frequencies, said path being formed by interconnecting a plurality of partial line sections, said partial line sections being connected in series and operated synchronously and independently of one another, comprising the steps of:

producing a write pulse responsive to the receiving station pulse frequency, storing, responsive to a write pulse, data signals arriving over a one of said partial line sections, producing a read pulse responsive to the transmission station pulse frequency, reading, responsive to a read pulse, the data signals from storage, comparing the frequencies of said transmission station pulse frequency and said receiving station pulse frequency, producing a regulating signal having a polarity and value proportional to the result of said comparing step and regulating the frequency and thereby the time of appearance of said transmission station pulses with said regulating signal.

2. The method defined in claim 1 wherein at least one comparison means is provided, comprising the additional steps of:

delaying said write pulse coupled to said comparison means, when no transmission station pulse appears between two successive receiving station pulses at least until the arrival of a succeeding transmission station pulse and emitting a regulating signal of one predetermined polarity from said comparison means when said delayed step has occurred.

3. The method defined in claim 2 wherein said transmission station frequency is regulated only after a multiple delay of said read pulse.

4. The method defined in claim 1 wherein at least one comparison means is provided, comprising the additional steps of:

delaying said read pulse, when no receiving station pulse appears between two successive transmission station pulses, at least until the arrival of the following receiving station pulse and emitting from said comparison means a regulating signal of the other polarity when said delaying step has occurred.

5. The method defined in claim 4 wherein said transmission station frequency is regulated only after a multiple delay of said read pulse.

6. Apparatus for synchronizing partial line sections constituting a data transmission path, each said partial line section being connected to transmitting and receiving circuits, which transmitting and receiving circuits have operating pulse frequencies, said partial line sections being sequentially connected, comprising:

matching circuit means for establishing and monitoring the frequency synchronization between two successive ones of said partial sections, said matching circuit being interposed between said two partial sections, said matching circuit means comprising:

storage means for receiving and storing data signals arriving over one of said partial sections, means for producing a write pulse responsive to the receiving station pulse frequency, said write pulse being communicated to said storage means for controlling the storing of data signals therein, means for producing a read pulse responsive to the transmission station pulse frequency, data signals being read from said storage means responsive to said read signals, comparator means for comparing the frequencies of said transmission and receiving station pulse signals and for producing regulating signals proportional to the frequency difference between said transmission and receiving station signal frequencies and means for regulating said transmission station frequency responsive to the polarity and value of said regulating signal.

* * * * *